(12) United States Patent
Walker, II et al.

(10) Patent No.: US 7,993,203 B1
(45) Date of Patent: Aug. 9, 2011

(54) CONTROL STICK ADAPTER

(75) Inventors: Don B. Walker, II, Muscle Shoals, AL (US); Lloyd G. B. Cooper, Birmingham, AL (US)

(73) Assignee: KontrolFreek, LLC, Atlanta, GA (US)

( * ) Notice: Subject to any disclaimer, the term of this patent is extended or adjusted under 35 U.S.C. 154(b) by 701 days.

(21) Appl. No.: 11/754,626

(22) Filed: May 29, 2007

(51) Int. Cl.
*G09G 5/08* (2006.01)
(52) U.S. Cl. .......... 463/47; 463/37; 345/161; 273/148 R
(58) Field of Classification Search ............... 463/47, 463/37; 345/161; 273/148 B; D14/454
See application file for complete search history.

(56) References Cited

U.S. PATENT DOCUMENTS 5,476,261 A * 12/1995 Hultstrand ................. 273/148 B
5,883,690 A * 3/1999 Meyers et al. ................ 345/161
6,557,853 B2 * 5/2003 Huettlinger ............... 273/148 B

FOREIGN PATENT DOCUMENTS

WO    WO-2008/002926 A2 *    1/2008
* cited by examiner

*Primary Examiner* — Melba Bumgarner
*Assistant Examiner* — Lawrence Galka
(74) *Attorney, Agent, or Firm* — Kenneth M. Bush; Gerald M. Walsh; Bush Intellectual Property Law

(57) ABSTRACT

A control mechanism adapter for a game console having a circular base with an upper surface, an under surface, and a central opening, wherein the central opening allows a user's finger to rest directly on the control mechanism of a game console. There are legs on the under surface of said base, and attachment elements on the legs to attach the base to a control mechanism of a game console. The base has two raised control elements on the upper surface and on opposing sides of the base. The open center allows the user's thumb to rest on the same standard control geometry that the user is accustomed to using. The user has the option to press against the raised elements, either laterally or with the tip of the thumb. The raised element feature allows the user to manipulate the control lever with less downward muscular force and with improved dexterity.

4 Claims, 3 Drawing Sheets

CONTROL STICK ADAPTER

BACKGROUND OF THE INVENTION

1. Field of the Invention

The present invention relates to game consoles and, more particularly, to adapters for control sticks on a game console to improve hand and finger comfort and to improve game performance.

2. Technical Background

The gaming market is rapidly growing with game console production reaching new levels each year. Although the controllers on the game consoles are becoming more ergonomic, they are still lacking in key comfort, fit and performance. One particular drawback is the design of the current main input stick control, often referred to as a thumb stick. This stick, which normally has a tip formed as a rounded button top approximately 10-30 mm in diameter, can get slippery from perspiration through extended use. In addition the user must apply constant downward force on the thumb stick while playing. These two problems cause increased muscular tension, joint stress and can result in muscle soreness and ultimately repetitive stress-type injuries. Joystick covers are known which fit over the top of a joystick to cover the thumb or to improve contact with the joystick. These devices either do not support the thumb or they restrict its movement. What is needed is a variety of different adapters that can attach to existing thumb sticks, allowing the user to choose the particular shape and/or material combination which best fits the user's particular gaming needs.

SUMMARY OF THE INVENTION

The present invention is a control stick or lever adaptor for a gaming console. The adapter has a circular base with a central opening. On the under surface of the base are legs with attachment elements to attach the base to a control stick, such as a steering stick or lever. On the upper surface of the base are raised elements on opposing sides of the base, forming a U-shaped configuration. The raised elements can be reversibly attached to the base. The open center allows the user's thumb to rest on the same standard control geometry that the user is accustomed to using. The user has the option to press against the raised elements, either laterally or with the tip of the thumb. The raised element feature allows the user to manipulate the control lever with less downward muscular force and with improved dexterity.

An advantage of the present invention are adapters that will make gaming more comfortable by reducing stress, and will improve game performance by enhancing the feel of the game and the accuracy of the user's manipulation of the steering stick.

Another advantage is modular set of control stick extenders or adapters formed in a variety of shapes, and potentially a variety of surface textures and materials.

Another advantage is an adapter that can be used with any of the current game consoles' control thumb sticks by adapting the base of the adapter module to fit the particular game console control stick surface.

DETAILED DESCRIPTION OF THE PREFERRED EMBODIMENT

Figure 1:
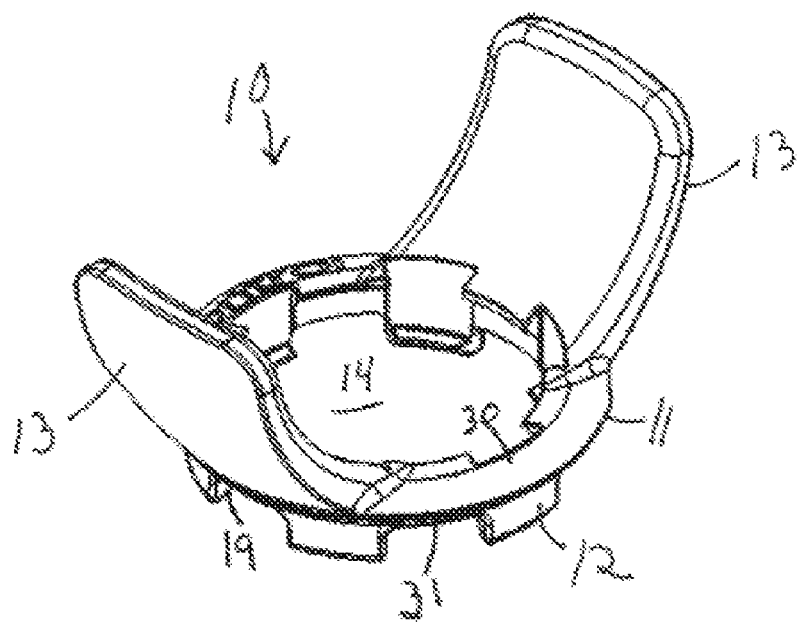
FIG. 1 shows a perspective view of the adapter of the present invention.
Figure 2:
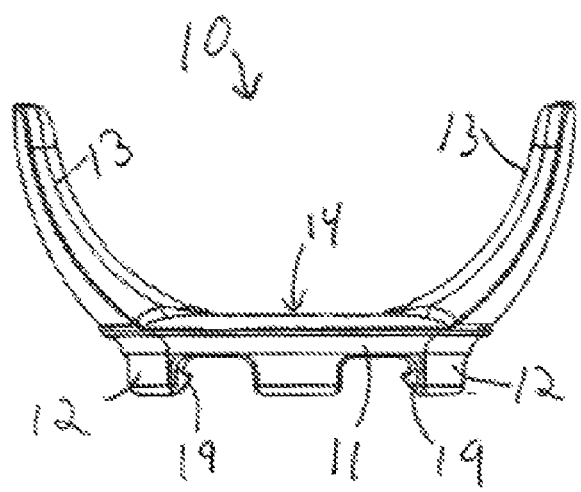
FIG. 2 shows a front view of the adapter.
Figure 3:
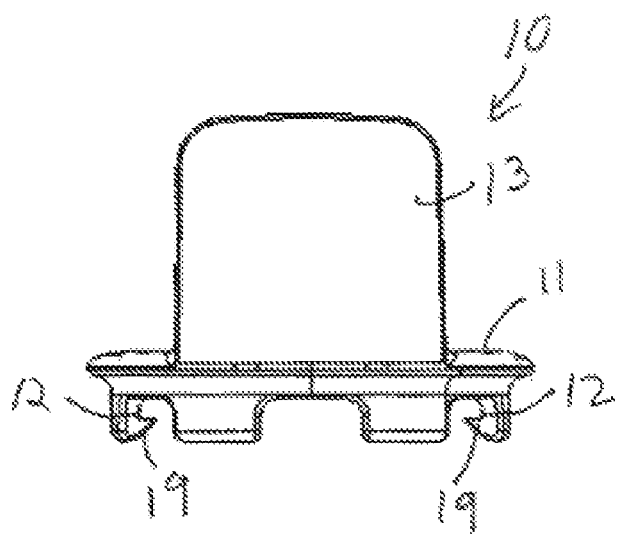
FIG. 3 shows a side view of the adapter.

FIG. 1 shows a perspective view of the control stick adapter 10 of the present invention. The adapter 10 has a base 11 with an upper surface 30 and under surface 31. Upper surface 30 has two raised control elements 13 which may be fixed to upper surface 30 or reversibly attached to upper surface 30. The control elements 13 form, preferably, a U-shaped configuration, and are located on opposite sides of base 11. Under surface 31 has a plurality of legs 12 with attachment elements 19. Attachment elements 19 attach the base 11 of adapter 10 to a control mechanism such as a stick, lever, or button on a game console. The center of base 11 has a hole or opening 14. The open center 14 allows the user's thumb to rest on the same standard control mechanism that the user is accustomed to using. The user has the option to press against the raised control elements 13, either laterally or with the tip of the thumb. The raised control elements 13 allow the user to manipulate the control lever with less downward muscular force and with improved dexterity. FIG. 2 shows a front view of adapter 10 and FIG. 3 a side view of adapter 10.

Figure 4:
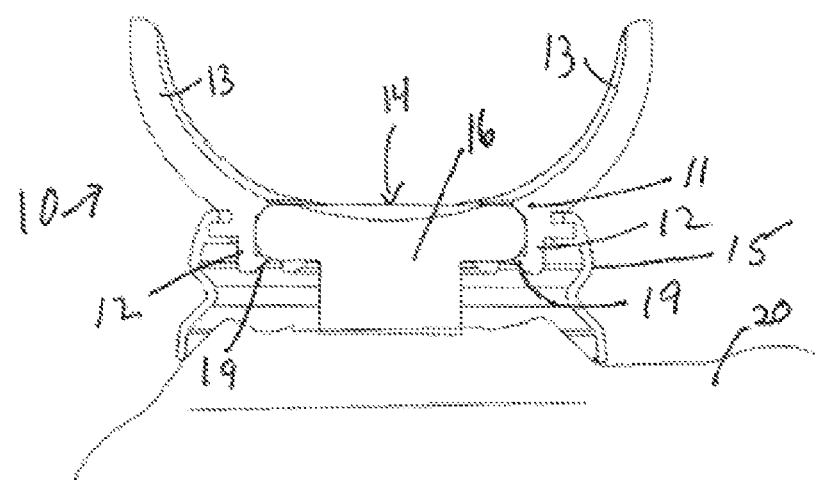
FIG. 4 shows a cross-sectional view of the adapter in place on a steering stick.

FIG. 4 shows a cross-sectional view of adapter 10 in place on a control mechanism, such as a steering stick 16 on a game console 20. FIG. 4 further shows a circular support ring 15 which covers base 11, legs 12, attachment elements 19 and steering stick 16. This circular support ring 15 can be made of different materials with different spring rates or elasticity to provide a natural spring assist or dampening action. This type of design is useful for games that require precise manipulation of the control lever 16, such as, for example, first person shooter games that involve aiming a weapon, or certain steering games. The circular support ring 15 can fit on the base 11 of any adapter 10 of the present invention.

Figure 5:
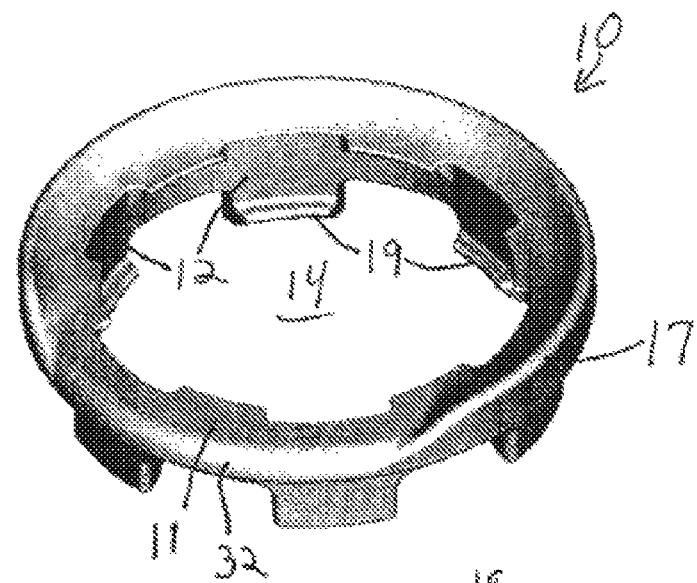
FIG. 5 shows an alternant embodiment of the adapter.

FIG. 5 shows an alternate embodiment of adapter 10 where raised control elements 13 are replaced by a raised rim 17 which extends partway around the circumference of base 11, with a rounded lip 32 along the rear surface of base 11, closest to the user. This design offers the user greater control where the user does not desire the large raised control elements 13. The rounded lip 32 on the rear surface allows the user to top the lever 16 forward while allowing clearance for the base of the user's thumb.

Figure 6:
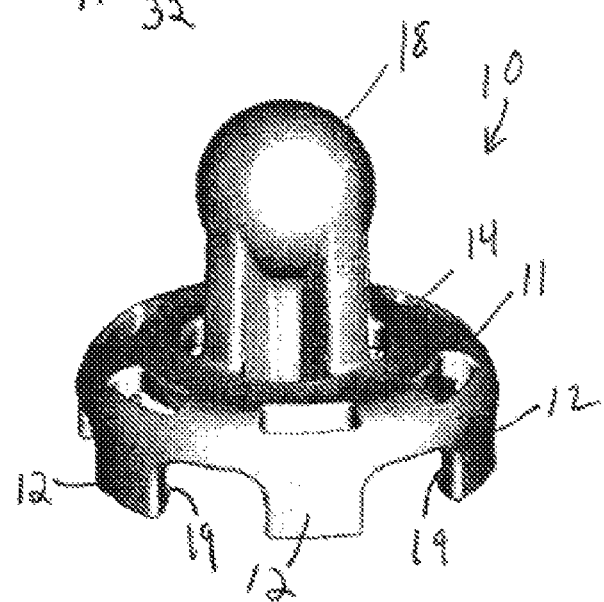
FIG. 6 shows a joy stick adapter.

FIG. 6 shows an adapter 10 constructed as a joystick 18, forming a lever extension-type accessory. This design provides an extended lever off of the standard console control lever face. Games that benefit from this design include golfing games that require the user to move the console lever along a very precise axis.

Figure 7:
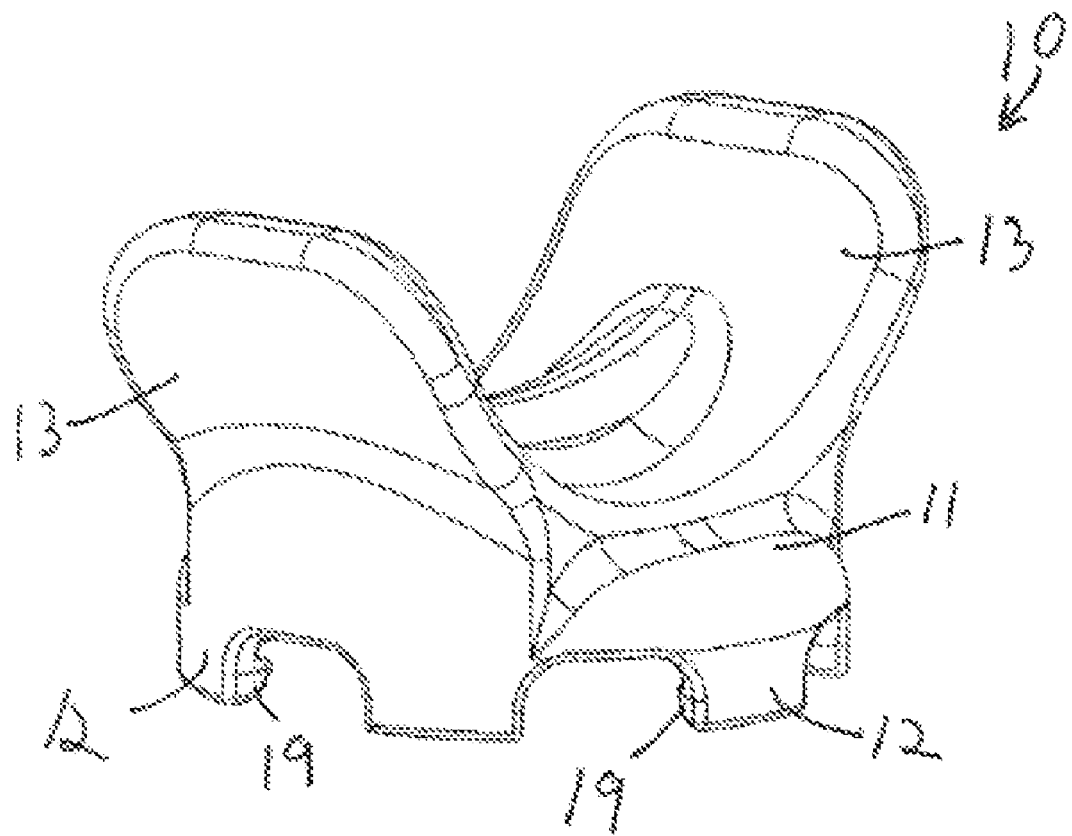
FIG. 7 shows an embodiment of the adapter having a solid base.

FIG. 7 shows an embodiment of adapter 10 in which base 11 is solid, not having opening 14.

The control stick adapters of the present invention provide a series of different adapters that can snap on existing thumb sticks, allowing the user to choose from a modular assortment of designs. The user can select a particular shape and/or material combination which best fits the user's particular gaming needs. The adapters will not only make gaming more comfortable by reducing stress, but they will also improve game performance by enhancing the feel of the game and the accuracy of the user's inputs.

The adapters can be constructed to provide a modular set of control stick extenders and adapters formed in a variety of shapes and surface textures. These adapters are affixed onto the end of the existing control stick by a range of means including but not limited to snap-on friction fit, adhesive, bolting, or other fastening means. This design can adapt to any of the current game consoles' control thumb sticks by adapting the base of the adapter module to fit the particular game console control stick surface.

A user can choose the particular adapter with the contour, shape, texture and/or material that best matches the user's preferences for that particular game. The user can affix the adapter onto his or her existing controller and then adjust the adapter to a desired comfort position by rotating and/or shifting the adapter on the surface of the control stick. The user can then immediately start playing the game.

The adapter can range in size and shape. Shapes may range from "U"-shaped cups to support the finger on one or more sides to taller, lever-type forms that act as extended mechanical levers. The adapter is, preferably, made of one or two parts that snap onto an existing control stick. The structure could alternatively be made as a base module that permanently attaches to the control stick tip, with different parts that easily and securely attach to this base. Many different shapes and sizes can be designed for different types of gaming and gaming styles, using the same basic base 11 structure of the present invention.

The foregoing description has been limited to specific embodiments of this invention. It will be apparent, however, that variations and modifications may be made by those skilled in the art to the disclosed embodiments of the invention, with the attainment of some of all of its advantages and without departing from the spirit and scope of the present invention. For example, the adapter can be made in a variety of ways with the most common being plastic injection molding. This adapter can be constructed of several components which can also be injection molded. As noted above, the base 11 is the part that snaps on to the controller thumb stick and forms a certain shape for the gamer to user with the thumb. The adapter base 11 could permanently attach to the thumb stick and then could receive a number of different shapes and sizes of control elements. This would limit the number of times one would have to attach the base 11 onto a thumb stick. This part could also be injection molded. An adapter insert could be a control element that takes on many shapes and sizes and could snap or press into the adapter base.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A control mechanism adapter for a game console, comprising:
   a) a circular base having an upper surface, an under surface, and a central opening, wherein said opening allows a user's finger to rest directly on a control mechanism of a game console;
   b) legs on said under surface of said base;
   c) attachment elements on said legs to attach said base to the control mechanism of the game console;
   d) two raised control elements on said upper surface of said base and on opposing sides of said base; and
   e) a circular support ring covering said base, said legs, said attachment elements, and the control mechanism, wherein said circular support ring provides a spring assist or dampening action to said base.

2. A control mechanism adapter for a game console comprising:
   a) a circular base having an upper surface, an under surface, and a central opening, wherein said opening allows a user's finger to rest directly on a control mechanism of a game console;
   b) legs on said under surface of said base;
   c) attachment elements on said legs to attach said base to the control mechanism of the game console;
   d) a raised rim on said upper surface around a portion of the circumference of said base; and
   e) a circular support ring covering said base, said legs, said attachment elements, and the control mechanism, wherein said circular support ring provides a spring assist or dampening action to said base.

3. A control mechanism adapter for a game console comprising:
   a) a circular base having an upper surface, an under surface, and a central opening extending through said circular base, wherein said opening allows a user's finger to rest directly on a control mechanism of a game console;
   b) legs on said under surface of said base;
   c) attachment projections on tips of said legs to attach said base to the control mechanism of the game console;
   d) two raised control elements on said upper surface of said base and on opposing sides of said base, thereby forming a U-shaped configuration so that said raised control elements engage the sides of a user's finger; and
   e) a circular support ring covering said base, said legs, said attachment elements, and the control mechanism, wherein said circular support ring provides a spring assist or dampening action to said base.

4. A control mechanism adapter for a game console comprising:
   a) a circular base having an upper surface, an under surface, and a central opening extending through said circular base, wherein said opening allows a user's finger to rest directly on a control mechanism of a game console;
   b) legs on said under surface of said base;
   c) attachment projections on tips of said legs to attach said base to the control mechanism of the game console;
   d) a raised rim on said upper surface around a portion of the circumference of said base; and
   e) a circular support ring covering said base, said legs, said attachment elements, and the control mechanism, wherein said circular support ring provides a spring assist or dampening action to said base.

* * * * *